United States Patent
Overmyer et al.

(10) Patent No.: US 11,465,468 B2
(45) Date of Patent: Oct. 11, 2022

(54) WINDOW OVERMOLD

(71) Applicant: GENTEX CORPORATION, Zeeland, MI (US)

(72) Inventors: Nathan T. Overmyer, Caledonia, MI (US); Luke A. Bomers, Grandville, MI (US); David J. Cammenga, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 73 days.

(21) Appl. No.: 17/126,990

(22) Filed: Dec. 18, 2020

(65) Prior Publication Data

US 2021/0191219 A1      Jun. 24, 2021

Related U.S. Application Data

(60) Provisional application No. 62/949,774, filed on Dec. 18, 2019.

(51) Int. Cl.
*B60J 1/00* (2006.01)
*G02F 1/161* (2006.01)
(Continued)

(52) U.S. Cl.
CPC ............... *B60J 1/007* (2013.01); *B60J 1/001* (2013.01); *B60J 1/20* (2013.01); *B60J 3/04* (2013.01); *G02F 1/161* (2013.01)

(58) Field of Classification Search
CPC .. G02F 1/161; B60J 1/004; B60J 1/007; B60J 1/001; B60J 3/04; B60J 1/17; B60J 10/74; B60J 1/20
(Continued)

(56) References Cited

U.S. PATENT DOCUMENTS 3,375,626 A * 4/1968 Grotefeld .......... B32B 17/10302
52/204.597
4,823,511 A * 4/1989 Herliczek ................ B60J 10/74
49/404
(Continued)

FOREIGN PATENT DOCUMENTS

CN      109476218 A     3/2019
DE      10061149 A1     6/2002
(Continued)

OTHER PUBLICATIONS

Machine translation DE 102004063509.*
(Continued)

*Primary Examiner* — D Glenn Dayoan
*Assistant Examiner* — Kevin P Weldon
(74) *Attorney, Agent, or Firm* — Price Heneveld LLP; Brian James Brewer

(57) ABSTRACT

An overmold is disclosed, wherein the overmold may be incorporated into a window assembly. The overmold comprises a base portion and a receiving portion. The receiving portion may comprise a notch or a channel operable to receive a window. The window may be such that when coupled with the overmold, the sides of the overmold and the window are substantially co-planar. Accordingly, window may comprise a first and a second substrate, wherein the second substrate is coupled to a first side of the first substrate. Further, the first substrate may extend beyond the second substrate. Therefore, the overmold, when in abutting contact with the window, may extend onto the first side of the first substrate up to the second substrate.

12 Claims, 4 Drawing Sheets

(51) Int. Cl.
  *B60J 3/04* (2006.01)
  *B60J 1/20* (2006.01)

(58) Field of Classification Search
  USPC ............... 296/146.15, 146.2, 96.21, 201
  See application file for complete search history.

(56) References Cited

U.S. PATENT DOCUMENTS

| | | | |
|---|---|---|---|
| 10,234,720 B2 | 3/2019 | Saenger Nayver et al. | |
| 10,625,580 B1* | 4/2020 | Jones | B60J 3/007 |
| 2003/0137715 A1* | 7/2003 | Poll | E06B 3/6775 |
| | | | 359/275 |
| 2014/0247473 A1* | 9/2014 | Kuhnen | B60J 10/74 |
| | | | 359/238 |
| 2018/0312047 A1* | 11/2018 | Howard | B60J 1/2094 |
| 2019/0270282 A1* | 9/2019 | Sauvinet | B60J 1/17 |
| 2021/0079709 A1* | 3/2021 | Kleyer | B60J 1/17 |

FOREIGN PATENT DOCUMENTS

| | | | | |
|---|---|---|---|---|
| DE | 102004063509 A1 | 7/2006 | | |
| FR | 2649749 A1 * | 10/1991 | | B60J 10/75 |
| GB | 2123884 A | 2/1984 | | |
| WO | WO-2011138834 A1 * | 11/2011 | | B60J 1/17 |

OTHER PUBLICATIONS

International Search Report dated Feb. 25, 2021, for corresponding PCT application No. PCT/US2020/066020, 2 pages.
Written Opinion dated Feb. 25, 2021, for corresponding PCT application No. PCT/US2020/066020, 5 pages.

* cited by examiner

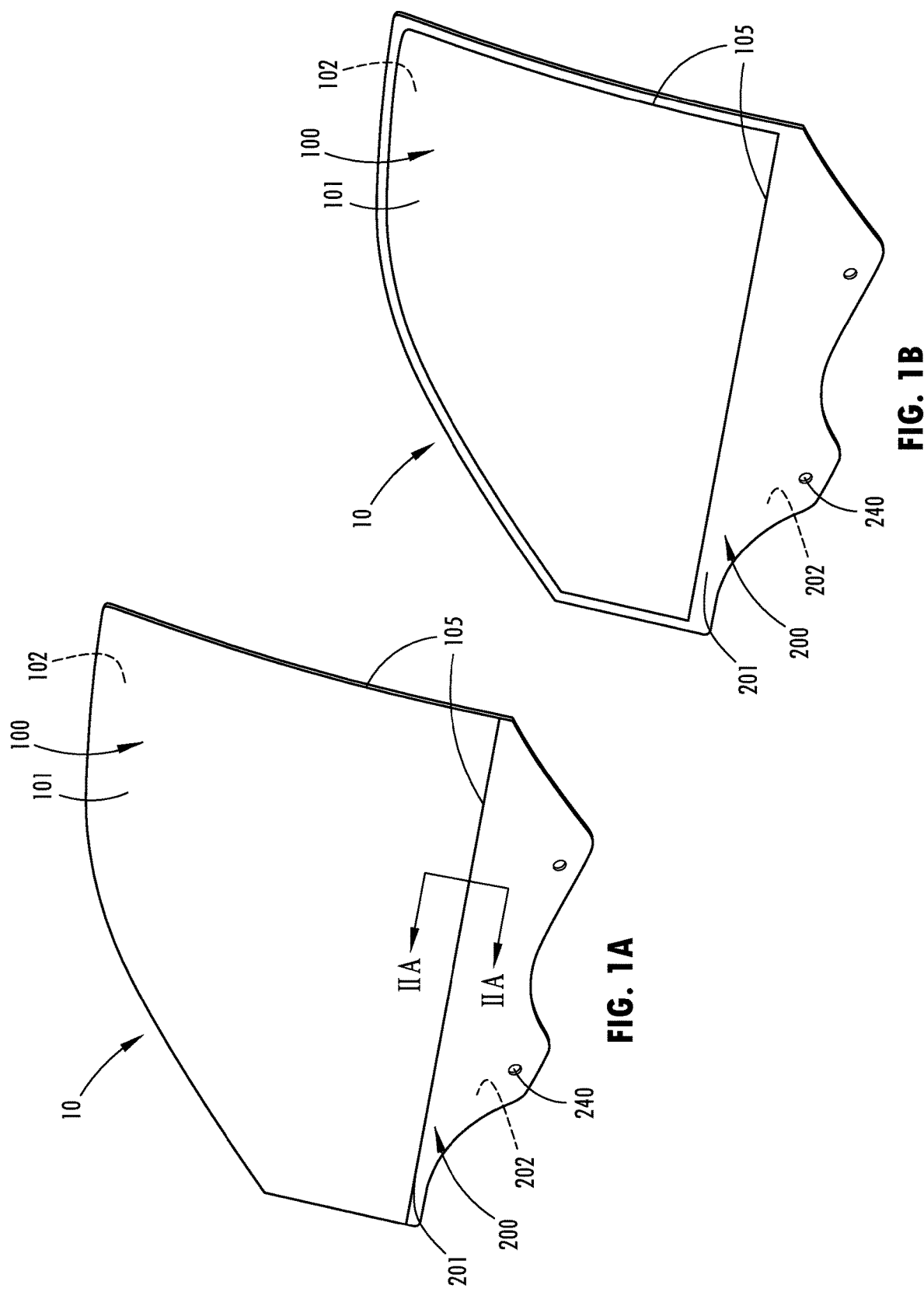

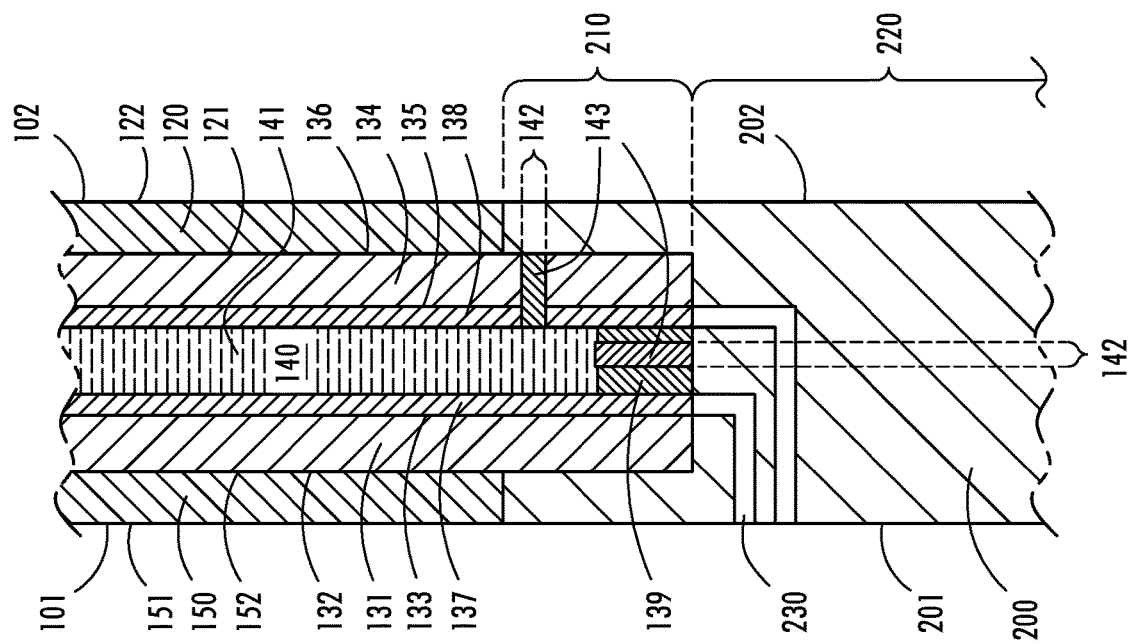
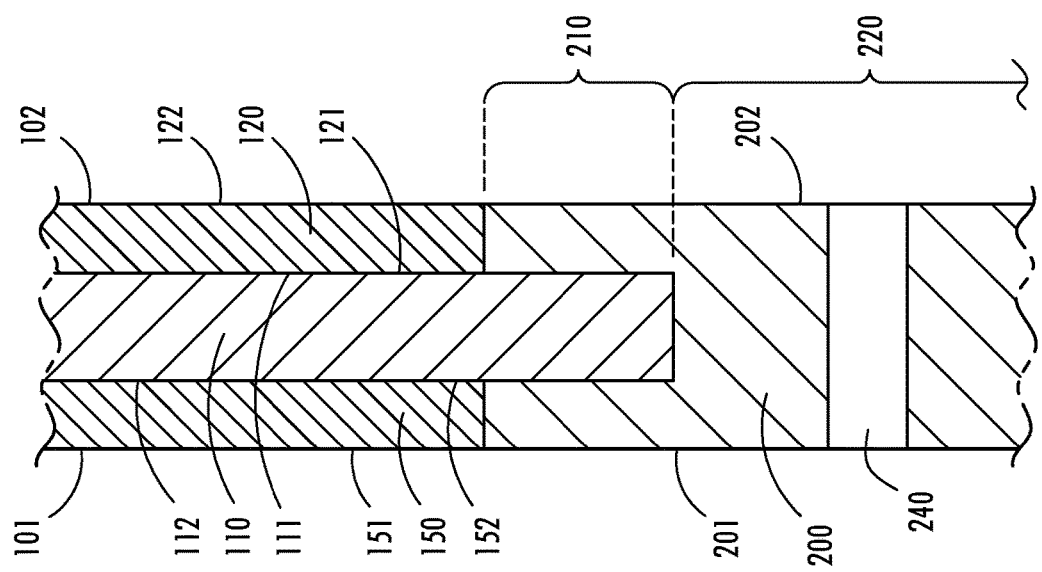

WINDOW OVERMOLD

CROSS-REFERENCE TO RELATED APPLICATIONS

This application claims priority under 35 U.S.C. § 119(e) to U.S. Provisional Application No. 62/949,774 filed on Dec. 18, 2019, entitled "WINDOW OVERMOLD," the disclosure of which is hereby incorporated by reference in its entirety.

FIELD OF INVENTION

The present disclosure is generally related to windows. More particularly, it is related to windows with reduced weight and enhanced modifiability.

BACKGROUND OF INVENTION

Windows have been used in vehicles for a long time. These windows, particularly in the context of automobiles, are commonly configured to actuate up and down (i.e. between open and closed positions). Additionally, they often use thick glass, making them very heavy, and they also have complex cuts for fit. Further, actuators for raising and lowering the windows often require holes to be drilled therein. However, cutting glass in these complex shapes and drilling holes therein is difficult—particularly in the instance of electro-optic windows. Such actions may compromise the function or durability of the window. Accordingly, there is a need for an improved window.

SUMMARY

In accordance with the present disclosure, the disadvantages and problems associated with vehicle windows made of glass or comprising an electrochromic element have been substantially reduced or eliminated.

According to one aspect of the present disclosure, a window assembly is disclosed. The window assembly may comprise a window and an overmold. The window may have a first side and a second side. Likewise, the overmold may have a first side and a second side. Additionally, the overmold may comprise a base portion and a receiving portion. The receiving portion may comprise a notch or a channel operable to receive the window. Further, the overmold may be configured to receive the window such that the first and second sides of the window join in a substantially co-planar manner with the first and second sides of the overmold, respectively. Furthermore, the overmold may comprise one or more housing for electronic components and/or extend about an entire periphery of the window.

In some embodiments, the window may comprise a first substrate and a second substrate.

The second substrate may be coupled to a first side of the first substrate such that the first substate extends beyond the second substate. In such an embodiment, the overmold may be in abutting contact with the window and extends onto the first side of the first substrate. Further, the overmold may extend up to the second substrate. Additionally, in some further embodiments, the window may further comprise a third substate coupled to a second side of the first substate such that the first substrate extends beyond the third substrate. Furthermore, the overmold may extend onto the second side of the substrate and, in some embodiments, extend up to the third substrate.

In another embodiment, the first substrate may comprise a variably transmissive electro-optic element. The electro-optic element may comprise a fill port. In such an embodiment, the overmold may provide a sealed barrier between the fill port and an environment surround the window assembly.

According to another aspect of the present disclosure, an overmold is disclose. The overmold may comprise a base portion and a receiving portion. The receiving portion may comprise a notch or a channel. Further, the receiving portion may be operable to receive a window such that the overmold and the window couple in a substantially co-planar manner along sides thereof at the point of joinder. The received window comprising a first substrate and a second substate where the second substrate is coupled to a first side of the first substrate and the first substrate extends beyond the second substrate. In some embodiments, the base portion may comprise one or more holes operable to interface with a window regulator and/or one or more housings for electronic components.

According to yet another aspect of the present disclosure, a window assembly is disclosed. The window assembly may comprise a window and an overmold. The window may have a first side and a second side and comprise a first substrate and a second substrate. A first side of the second substrate may be coupled to a first side of the first substate such that the first side of the first substrate extends beyond the first side of the second substrate. Likewise, the overmold may have a first side and a second side. The overmold may be in abutting contact with the window and extend onto the first side of the first substrate. Further, the overmold may have a thickness of less than the window such that the first side of the window extends outward beyond the first side of the overmold. In some embodiments, the second side of the window may be substantially co-planar with the second side of the overmold. In other embodiments, the second side of the window may extend outward beyond the second side of the overmold. In such an embodiment, the window may further comprise a third substrate having first and second sides. The second side of the third substrate may be coupled to a second side of the first substrate. Additionally, in some embodiments, the first substrate may comprise an electro-optic element.

The advantages of certain embodiments of the present disclosure include reducing weight by reducing the size of glass pieces needed for a movable window assembly by substituting regions that would otherwise be made of a higher density window with a lower density overmold material. Further, certain embodiments have the technical advantage of producing a window assembly wherein sides of the window and overmold join in a substantially co-planar fashion, reducing or eliminating problems associated with non-linear, movable surfaces. Additionally, certain embodiments have the technical advantage in that the overmold is more easily manufactured or modified into desirable or complex shapes than glass. Further, in some embodiments, the overmold may be formed to provide for holes and housings therein. This is particularly advantageous wherein the window comprises an electro-optic element, as, for example, these elements may not simply have a hole drilled therethrough without compromising the function or durability of the window. Moreover, some embedment's, have the advantage of providing superior contact between the window and the overmold. In particular, embodiments wherein the overmold comprises a notch or a channel, for interfacing with the window, have greatly increased contact area over embodiments without. These embodiments, via contact in additional orientations, also allow for the overmold, when movable, to apply pulling forces not only perpendicular to the window edge, but parallel thereto. These increased surface areas and additional contact orientations may lead to enhanced bonding strength between the window and the overmold, possibly leading to improved durability and mechanical stability of the window assembly. Finally, in some embodiments, the overmold has the advantage of providing an additional layer of protection at fill port of an electro-optic device, thereby minimizing electro-optic media from leaking out and/or air leaking in to the electro-optic chamber, increasing durability of the electro-optic element.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

BRIEF DESCRIPTION OF FIGURES

In the drawings:

FIG. 1a: a schematic representation of a window assembly.

FIG. 1b: a schematic representation of a window assembly with an overmold encompassing the window periphery.

FIG. 2c: a cross-sectional, schematic representation of a window assembly wherein an overmold comprises a channel.

FIG. 2d: a cross-sectional, schematic representation of a window assembly wherein a window comprises an electro-optic element.

DETAILED DESCRIPTION

Figure 2B:
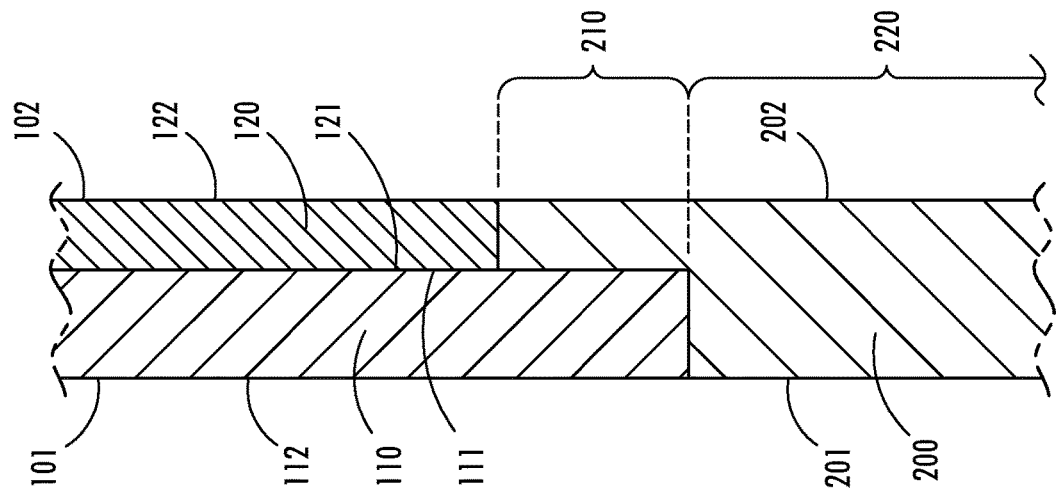
FIG. 2b: a cross-sectional, schematic representation of a window assembly wherein an overmold comprises a notch.
Figure 2A:
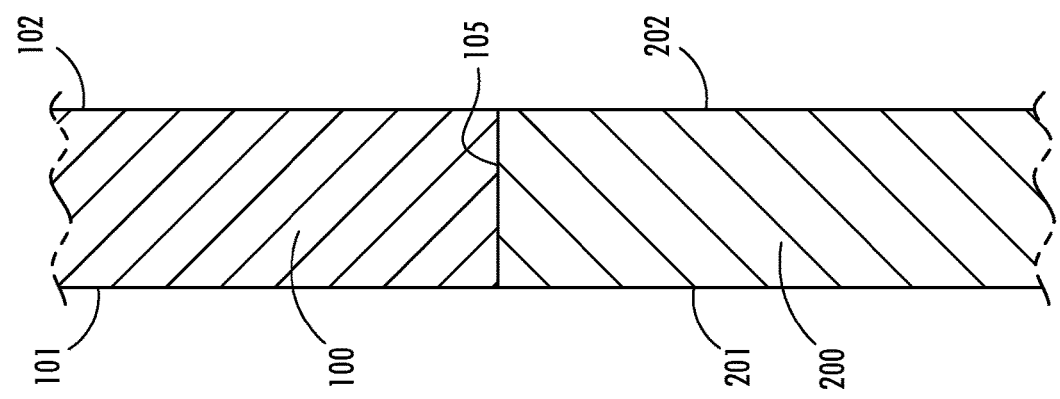
FIG. 2a: a cross-sectional, schematic representation of a window assembly.

Reference will now be made in detail to present embodiments of the invention, examples of which are illustrated in the accompanying drawings. Whenever possible, the same reference numerals will be used throughout the drawings to refer to the same or like parts.

For the purposes of description herein, the specific devices and processes illustrated in the attached drawings and described in the following specification are exemplary embodiments of the inventive concepts defined in the appended claims. Specific dimensions and other physical characteristics relating the embodiments disclosed herein are not to be considered as limiting, unless the claims expressly state otherwise.

The present disclosure is directed to improved window assemblies. FIGS. 1a-2f are representations of a window assembly 10. Window assembly 10 may comprise a window 100 and an overmold 200. Further, window assembly 10 may be operable between open and closed positions. Additionally, window assembly 10 may be fit into a vehicle, such as a car, a truck, a buss, a van, a train, etc.

Window 100 is a panel operable to serve as a barrier between environments on either side thereof. Window 100 has a first side 101 and a second side 102. The first and second sides 101 and 102 may correspond to the outermost surfaces of window 100 opposite one another. Additionally, window 100 comprises an edge 105 about a periphery thereof. Edge 105 may be ground, rounded, or frosted at a part or an entirety thereof. Further, in some embodiments, as shown in FIGS. 2a-2F, window 100 may comprise one or more substrates. Specifically, window 100 may comprise a first substrate 110 and/or a second substrate 120. Furthermore, window 100 may be substantially transparent in the visible spectrum to facilitate a view therethrough. In some embodiments, first substrate 110 and second substrate 120 may be laminated together with an optically coupled adhesive, such as, PVB, EVA, PSA, or other generally transparent bonding materials. Further, in some embodiments, window 100 may be laminated with additional substrates. The additional substrates and/or the bonded lamination of substrates may increase the safety of window 100 in the event of damage or may reduce cabin noise.

First substrate 110 comprises a first side 111 and a second side 112 opposite first side 111. In some embodiments, second side 112 of first substrate 110 may serve as first side 101 of window 100. Further, first substrate 110 may be fabricated from boroaluminosilicate ("BAS") glass; polycarbonate, such as ProLens® polycarbonate, commercially available from Professional Plastics, which may be hard-coated; polyethylene terephthalate, such as but not limited to Spallshield® CPET available from Kuraray®; soda lime glass; natural and synthetic polymeric resins; plastics; and/or composites. While particular substrate materials are disclosed, for illustrative purposes only, numerous other substrate materials likewise may be used.

Second substrate 120, as shown in FIGS. 2b-2f, comprises a first side 121 and a second side 122 opposite first side 121. Further, first side 121 of second substrate 120 may be associated with first side 111 of first substrate 110. Accordingly, first side 121 of second substrate 120 may be coupled to and disposed on first side 111 of first substrate 110. Furthermore, second substrate 120 may be disposed such that first substrate 110 extends beyond second substrate 120 at all or part of edge 105. Additionally, second substrate 120 may be fabricated from the same materials suitable for first substrate 110. In some embodiments, second side 122 of second substrate 120 may serve as second side 102 of window 100.

Furthermore, in some embodiments, as show in FIG. 2d, first substrate 110 may further comprise an electro-optic element 130. Electro-optic element 130 may be an electrochromic, a liquid crystal, or a suspended partial device. As such, electro-optic element 130 may be variably transmissive. Electro-optic element 130 may comprise a first EO substrate 131, a second EO substrate 134, a first electrode 137, a second electrode 138, a sealing member 139, a chamber 140, and/or an electro-optic medium 141.

First EO substrate 131 comprises an outward surface 132 and an inward surface 133. In some embodiments, outward surface 132 may serve as second side 112 of first substrate 110. First EO substrate 131 may be fabricated from similar materials as first substrate 110. Further, the materials may be selected such that first EO substrate 131 is transparent or substantially transparent in the visible region of the electromagnetic spectrum and tolerant to materials of the electro-optic element 130, such as electro-optic medium 141. In some embodiments, first EO substrate 131 may be fabricated from a flexible material.

Similarly, second EO substrate 134 comprises an inward surface 135 and an outward surface 136. In some embodiments, outward surface 136 may serve as first side 111 of first substrate 110. Second EO substrate 134 may be fabricated from the same materials as first EO substrate 131. Further, second EO substrate 134 may be disposed substantially parallel in a spaced apart relationship with first EO substrate 131.

Inward surface 133 of first EO substrate 131 and inward surface 135 of second EO substrate 134 may each face each other. Further, inward surface 133 of first EO substrate 131 and inward surface 135 of second EO substrate 134 may each be associated with an electrically conductive material to serve as first and second electrodes 137, 138, respectively. The electrically conductive materials of the first and second electrodes 137, 138 may be substantially transparent in the visible region; bond to the first and second EO substrates 131, 134, respectfully; be generally resistant to corrosion from materials contained within electro-optic element 130; and/or exhibit minimal diffusion or specular reflectance. Further, the electrically conductive material may be fabricated from a transparent conductive oxide (TCO), such as fluorine doped tin oxide (FTO), indium tin oxide (ITO), doped zinc oxide, or any other materials suitable to perform the functions described herein.

Sealing member 139 may be positioned a peripheral manner to, at least in part, define a chamber 140 in combination with first electrode 137, second electrodes 138, first EO substrate 131, and/or second EO substrate 134. Accordingly, in some embodiments, sealing member 139 may be disposed between the first and second EO substrates 131, 134. In some further embodiments, sealing member 139 may extend all the way to interior surface 112 of exterior EO substrate 110 and/or exterior surface 121 of interior EO substrate 120. In such an embodiment, the first and second electrodes 137, 138 may be partially removed where the sealing member 139 is positioned. Further, sealing member 139 may comprise any material that is capable of being adhesively bonded to one or more of the members with which it defines chamber 140 to in turn seal chamber 140, such that electro-optic medium 141 and/or other materials disposed in chamber 140 may not substantially, inadvertently leak out.

Electro-optic medium 141 is disposed in chamber 140. Accordingly, electro-optic medium 141 is disposed between the first and second electrodes 137, 138 and/or the first and second EO substrates 131, 134. In some embodiments, electro-optic medium 141 may be solution phase. In other embodiments, electro-optic medium 141 may be solid phase. Further, electro-optic medium 141 may comprise one or more material that upon activation, due to the application of an electrical potential, exhibits a change in absorbance at one or more wavelengths of the electromagnetic spectrum, preferably within the visible range. As such, in some embodiments, electro-optic medium 141 may comprise electroactive anodic and cathodic materials. Therefore, electro-optic medium 141 may be fabricated from any one of a number of materials, including, for example, those disclosed in U.S. Pat. No. 6,433,914, entitled "Color-Stabilized Electrochromic Devices," which is herein incorporated by reference.

Additionally, in some embodiments, electro-optic element 130 may also comprise one or more fill port 142. Fill port 142 may be any passageway or hole by which chamber 140 may be filled with electro-optic medium 141 and/or other materials. Specifically, this may be useful in embodiments where electro-optic medium 141 is in a solution. Further, fill port 142 may transect seal 139 or one or more substrates and/or electrodes of electro-optic element 130, such as through second EO substrate 134 and second electrode 138. Furthermore, fill port 141 may be sealed with a plug 143. Plug 143 may be any substance operable seal fill port 141 such that electro-optic medium 141 or other materials disposed within chamber 140 do not substantially leak out of chamber 140 via fill port 141.

Figure 2F:
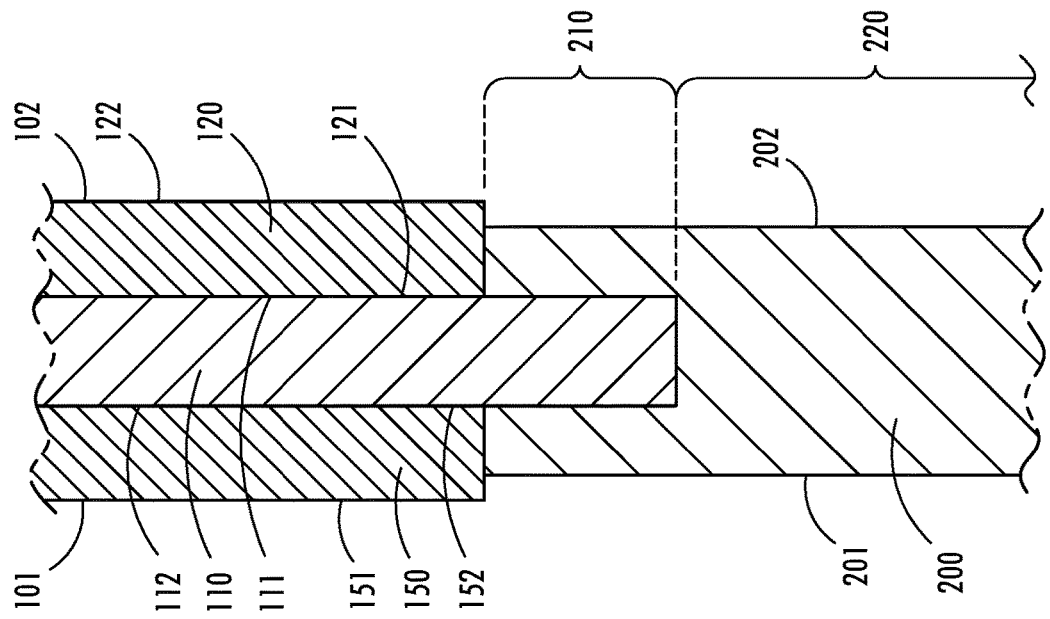
FIG. 2f: a cross-sectional, schematic representation of a window assembly wherein a window extends outward from a channeled overmold.

In some embodiments, as shown in FIGS. 2c-d and 2f, window 100 may also comprise a third substrate 150. Third substrate 150 comprises a first side 151 and a second side 152 disposed opposite first side 151. In some embodiments, first side 151 may serve as first side 101 of window 100. Further, second side 152 of third substrate 150 may be associated with second side 112 of first substrate 110. Accordingly, second side 152 of third substrate 150 may be coupled to and disposed on second side 112 of first substrate 110. Third substrate 150 may be disposed such that first substrate 110 extends beyond third substrate 150. Additionally, third substrate 150 may be fabricated from the same materials suitable for first substrate 110.

Figure 2E:
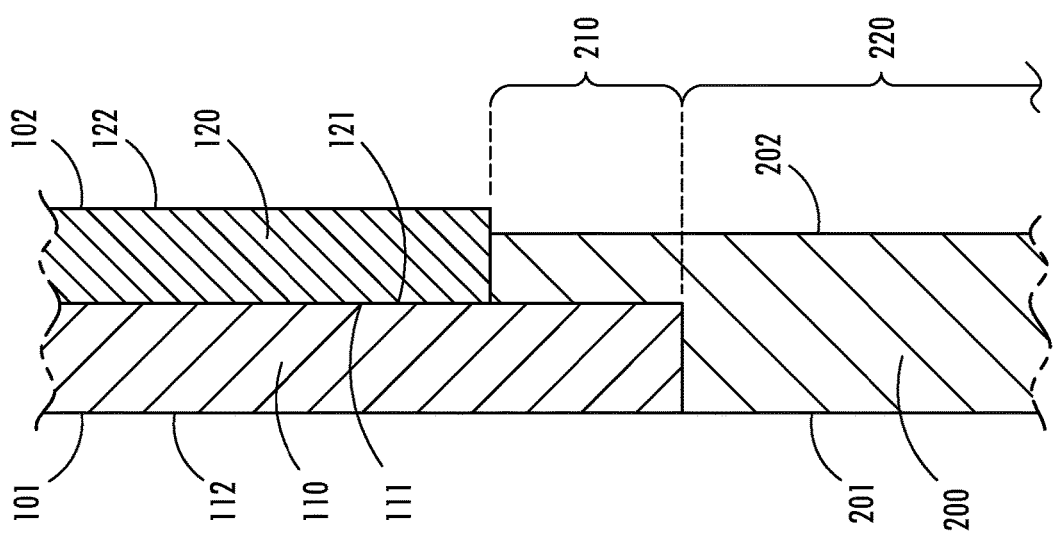
FIG. 2e: a cross-sectional, schematic representation of a window assembly wherein a window extends outward from a notched overmold.

Overmold 200 is a member operable to interface with window 100. Further, overmold 200 comprises a first side 201 and a second side 202. Additionally, overmold 200 may be in abutting contact with all or a portion of edge 105 and/or may be in abutting contact with the outward surfaces 132, 136 of the first and second EO substrates 131, 134. Further, a portion of overmold 200 in abutting contact with edge 105 may comprise an adhesive. In some embodiments, overmold 200 may further comprise a receiving portion 210 and a base portion 220. Receiving portion 210 may comprise a notch, as shown in FIGS. 2b and 2e, or a channel, as shown in FIGS. 2c-d and 2f. The notch may be such that second side 202 of overmold 200 substantially extends beyond first side 201 and creates a step. The channel may be such that a recess substantially extends into receiving portion 210 with receiving portion 210 extending around the recess on at least two sides. In some embodiments, the notch or channel may be such that the depth of the notch or channel may be greater than or equal to 2, 3, 4, 5, 6, 7, 8, 9, 10, 15, 20, 25, 30, 40, or 50 times the thickness of window 100. In other words, overmold 200 may extend onto first substrate 110 by a distance greater than or equal to 2, 3, 4, 5, 6, 7, 8, 9, 10, 15, 20, 25, 30, 40, or 50 times the thickness of window 100. The thickness of window 100 may correspond to the combined thicknesses of first substrate 110, second substrate 120, and/or third substate 150.

Additionally, in some embodiments, as shown in FIG. 2d, overmold 200 may further comprise one or more housings 230. Housing 230, for example, may be any channel, hole, or cavity. Further, housing 230 may be operable to hold any electronic component, for example, a circuit board, a wire, an electrical conductor, a switch, or a sensor. Furthermore, housing 230 may be a cavity extending through overmold 200 and up to first electrode 137 and/or second electrode 138. Moreover, the cavity may house a wire or be filled with an electrically conductive material thereby facilitating an electrical contact with first 137 and second 138 electrodes. Overmold 200 may also comprise one or more holes 240 operable to interface with a window regulator to raise and/or lower window assembly 10.

In some embodiments, overmold 200 may be disposed such that overmold 200 and window 100 are in abutting contact, wherein overmold 200 extends onto first side 111 of first substrate 110. Further, as shown in FIGS. 2a-d, first side 101 of window 100 and/or second side 102 of window 100 may join in a substantially co-planar manner with first side 201 of overmold 200 and/or second side 202 of overmold 200, respectively. In other words, window 100 and overmold 200 may be co-planar at a perimeter edge or at the point of joinder or contact. Alternatively, in other embodiments, as shown in FIGS. 2e-f, overmold 200 may have a thickness less than the thickness of window 100. In other words, window 100 may extend outward from overmold 200 at one or more sides thereof. In such an embodiment, the first and/or second sides 101, 102 of window 100 may extend outward relative the first and/or second sides 201, 202 of overmold 200. Outward may be defined as directions extending substantially perpendicular and away from the first and/or second sides 101, 102 of window and/or substantially perpendicular and away from the first and/or second sides 201, 202 of overmold 200. Accordingly, window 100 may extend outward relative one side of overmold 200 or two sides of overmold 200. Specifically, second substrate 120 and/or second side 122 of second substrate 120 may extend outward relative second side 202 over overmold 200. Similarly, third substate 150, first side 151 of third substrate 150, first substate 110 and/or second side 112 of first substate 110 may extend outward relative first side 201 of overmold 200. In embodiments where window 100 only extends outward relative one side of overmold 200, the other side of overmold 200 may be substantially co-extensive with a respective side of window 100. In some embodiments, overmold 200 may extend along a portion, as shown in FIG. 1a, or an entirety, as shown in FIG. 1b, of edge 105 of window 100. Further, window 100 and overmold 200 may be coupled together via an adhesive.

Additionally, in some further embodiments, wherein first substrate 110 comprises an electro-optic element 130, overmold 200 may form abutting contact with a surface of electrochromic element 130 such that fill port 142 is covered by overmold 200. Accordingly, overmold 200 may cover fill port 142 to act as a secondary, sealed barrier between fill port 142 and an environment surrounding window assembly 10, operable to further prevent substantial introduction of air into chamber 140 and/or substantial leakage of electro-optic medium 141 out of window assembly 10.

In operation, window assembly 10 may be operable to provide a mountable barrier between two sides thereof. Specifically, overmold 200, may interface with and/or accept window 100 such that window 100 may be mounted indirectly thereby overmold 200. Additionally, in some embodiments, window assembly 10 is operable to provide a movable barrier between two sides thereof. Specifically, in embodiments wherein overmold 200 comprises one or more holes 240, window assembly 10 may be operable such that when a window regulator directs holes 240 in an upward or downward direction, overmold 200 transfers this movement to window 100, and thus the overall window assembly 10, such that window 100 raises and lowers.

Further, in some embodiments, window assembly 10 may be operable to provide a movable barrier of variable transmittance. In operation of embodiments comprising electro-optic element 130, an electrical potential may be applied to the electro-optic medium via the first and second electrodes 137, 138. Accordingly, electro-optic medium 141 may change from a light transmissive state to a less transmissive state, in effect, darkening window 100, or vice versa.

Some aspects of the present disclosure may have the advantage of reducing weight by reducing the size of glass pieces needed for a movable window assembly by substituting regions, that would otherwise be made of higher density window 100 material, with lower density overmold 200 material. Further, some embodiments of the present disclosure have the advantage of producing a window assembly 10 wherein the sides of window 100 and overmold 200 join in a substantially co-planar fashion, reducing or eliminating problems associated with non-linear, movable surfaces, such as snagging. Additionally, overmold 200 may be more easily manufactured or modified into desirable or complex shapes than glass. Further, in some embodiments, overmold 200 may be formed to provide for holes and housings therein. This is particularly advantageous wherein window 100 comprises an electro-optic element 130, as, for example, these elements may not simply have a hole drilled therethrough without risking compromising the function or durability of the window. Moreover, some embedment's, have the advantage of providing superior contact between window 100 and overmold 200. In particular, embodiments where overmold 200 comprises a notch or a channel for interfacing with window 100 may have greatly increased contact area over embodiments without. These embodiments, via contact in additional orientations, also allow for overmold 200, when movable, to apply pulling forces not only perpendicular to the first and second sides 101, 102 of window 100, but parallel. These increased surface areas and additional contact orientations may lead to enhanced bonding strength between window 100 and overmold 200. Accordingly, improved durability and mechanical stability of window assembly 10 may be achieved. Further, overmold 200 may serve as a mechanical retainer for window 100 reducing the likelihood of electrical contact disconnection. In some embodiments, overmold 200 may have the advantage of providing an additional layer of protection at fill port 141, thereby minimizing electro-optic media 141 from leaking out of and/or air leaking in to chamber 140, increasing durability of electro-optic element 130. Finally, in some embodiments, overmold 200 may have the advantage of providing an additional layer of protection between an external environment and the first and second electrodes, thereby reducing the likelihood of corrosion of first and second electrodes 137, 138.

In this document, relational terms, such as "first," "second," and the like, are used solely to distinguish one entity or action from another entity or action, without necessarily requiring or implying any actual such relationship or order between such entities or actions.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The terms "including," "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element preceded by "comprises a . . . " does not, without more constraints, preclude the existence of additional identical elements in the process, method, article, or apparatus that comprises the elements.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

For purposes of this disclosure, the term "associated" generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A window assembly comprising:
   a window having a first side and a second side; and
   an overmold having a first side and a second side, the overmold configured to receive the window such that the first and second sides of the window join in a substantially co-planar manner with the first and second sides of the overmold, respectively;
   wherein:
      the window comprises:
         a first substrate having a first side,
         a second substate, the second substrate coupled to the first side of the first substrate, wherein the first substate extends beyond the second substrate, and
         a third substrate coupled to a second side of the first substrate, wherein the first substrate extends beyond the third substate; and
      the overmold:
         is in abutting contact with the window,
         extends onto the first side of the first substrate, and
         extends onto the second side of the first substrate.

2. The window assembly of claim 1, wherein the overmold extends along the first side of the first substrate up to the second substrate.

3. The window assembly of claim 1, wherein the overmold extends along the second side of the first substate up to the third substrate.

4. The window assembly of claim 1, wherein the first substate further comprises a variably transmissive electro-optic element.

5. The window assembly of claim 4, wherein:
   the electro-optic element further comprises a fill port; and
   the overmold provides a barrier between the fill port and an environment surrounding the window assembly.

6. The window assembly of claim 1, wherein the overmold further comprises a base portion and a receiving portion, the receiving portion comprising at least one of a notch or a channel operable to receive the window.

7. The window assembly of claim 1, wherein the overmold comprises one or more housing for electronic components.

8. The window assembly of claim 1, wherein the overmold extends about a periphery of the window.

9. The window assembly of claim 1, wherein the overmold further comprises one or more holes therethrough operable to interface with a window regulator to at least one of raise and lower the window the window assembly.

10. An assembly comprising:
    a window having a first side and a second side, the window comprising a first substate and a second substrate, a first side of the second substrate coupled to a first side of the first substrate, wherein first side of the first substrate extends beyond the first side of the second substrate; and
    an overmold having a first side and a second side, the overmold in abutting contact with the window, the overmold extending onto the first side of the first substrate, and the overmold having a thickness less than the window;
    wherein the first side of the window extends outward beyond the first side of the overmold; and
    wherein the second side of the window is substantially co-planar with the second side of the overmold.

11. The assembly of claim 10, wherein the first substrate comprises an electro-optic element.

12. The window assembly of claim 4, wherein the overmold further comprises at least one cavity extending through the overmold, the cavity at least one of housing a wire or filled with an electrically conductive material to facilitate an electrical connection with the electro-optic element.

* * * * *